(12) United States Patent
Wang et al.

(10) Patent No.: US 11,584,363 B2
(45) Date of Patent: Feb. 21, 2023

(54) METHOD, SYSTEM, AND APPARATUS FOR PROCESSING PARKING, AND VEHICLE CONTROLLER

(71) Applicant: Beijing Baidu Netcom Science and Technology Co., Ltd., Beijing (CN)

(72) Inventors: Zhao Wang, Beijing (CN); Zhencao Zhang, Beijing (CN); Jun Li, Beijing (CN); Cong Chen, Beijing (CN); Jianbo Zhu, Beijing (CN); Fulin Cheng, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 238 days.

(21) Appl. No.: 17/017,583

(22) Filed: Sep. 10, 2020

(65) Prior Publication Data
US 2021/0221358 A1 Jul. 22, 2021

(30) Foreign Application Priority Data

Jan. 20, 2020 (CN) .......................... 202010067384.4

(51) Int. Cl.
*B60W 30/06* (2006.01)
*B60W 50/06* (2006.01)
(Continued)

(52) U.S. Cl.
CPC ............ *B60W 30/06* (2013.01); *B60W 50/06* (2013.01); *G01S 15/931* (2013.01); *G06V 20/56* (2022.01);
(Continued)

(58) Field of Classification Search
CPC . B60W 2050/0006; B60W 2050/0005; B60W 30/06; B60W 50/06;
(Continued)

(56) References Cited

U.S. PATENT DOCUMENTS 9,378,601 B2 * 6/2016 Ricci ....................... H04L 67/12
9,984,572 B1 * 5/2018 Newman .......... G08G 1/096775
(Continued)

FOREIGN PATENT DOCUMENTS

CN   107600067 A    1/2018
CN   108749813 A    11/2018
(Continued)

OTHER PUBLICATIONS

Extended European Search Report for European Patent Application No. 20197040.7, dated Jun. 16, 2021 (17 pages).

*Primary Examiner* — Atul Trivedi
(74) *Attorney, Agent, or Firm* — Nixon Peabody LLP (57) ABSTRACT

The present disclosure provides a method, system, and apparatus for processing parking and a vehicle controller, and relates to the field of intelligent transportation technology, specifically to the field of automated parking technology. The method is executed by a parking system deployed on a vehicle controller, the parking system including a perception module and other modules except the perception module; the perception module being deployed on a first operating system in the vehicle controller; and the other modules being deployed on a second operating system in the vehicle controller; the method includes: processing an image collected by an image collector through the perception module to obtain perception result data; and controlling a vehicle based on the perception result data obtained from the perception module by the other modules.

13 Claims, 4 Drawing Sheets

```
                                            ┌── S110
┌────────────────────────────────────────────────────┐
│ Processing an image collected by an image collector │
│ through the perception module to obtain perception │
│                 result data                         │
└────────────────────────────────────────────────────┘
                          │
                          ▼               ┌── S120
┌────────────────────────────────────────────────────┐
│ Controlling a vehicle based on the perception      │
│ result data obtained from the perception module    │
│                by the other modules                │
└────────────────────────────────────────────────────┘
```

(51) Int. Cl.
  *G01S 15/931* (2020.01)
  *G06V 20/56* (2022.01)
(52) U.S. Cl.
  CPC .... *B60W 2420/54* (2013.01); *G01S 2015/932* (2013.01)
(58) Field of Classification Search
  CPC ........... B60W 2420/54; H04W 56/003; H04W 56/0065; B60R 2300/806; G01S 15/931; G01S 2015/932; H04J 3/0667; H04L 69/329; H04L 67/125; G06V 20/56; G06F 9/544; G08G 1/168; B62D 15/0285
  USPC .......................................................... 701/25
  See application file for complete search history.

(56) References Cited

U.S. PATENT DOCUMENTS

| | | | |
|---|---|---|---|
| 10,386,845 B1* | 8/2019 | Konrardy | G08G 1/167 |
| 2013/0282238 A1* | 10/2013 | Ricci | G06F 17/00 |
| | | | 701/99 |
| 2014/0001055 A1 | 1/2014 | Elibol et al. | |
| 2014/0302875 A1* | 10/2014 | Beaurepaire | G01C 21/3685 |
| | | | 455/456.3 |
| 2015/0294431 A1* | 10/2015 | Fiorucci | G07B 15/02 |
| | | | 705/13 |
| 2016/0086391 A1* | 3/2016 | Ricci | G06Q 30/06 |
| | | | 701/29.3 |
| 2016/0328254 A1 | 11/2016 | Ahmed et al. | |
| 2018/0308015 A1* | 10/2018 | Kumar | G06Q 10/02 |
| 2019/0235513 A1 | 8/2019 | Li et al. | |
| 2019/0256091 A1* | 8/2019 | Lepp | B60W 30/0956 |
| 2019/0279440 A1* | 9/2019 | Ricci | H04W 4/48 |
| 2020/0001863 A1* | 1/2020 | Li | B60W 60/001 |
| 2020/0004251 A1 | 1/2020 | Zhu et al. | |
| 2020/0014525 A1 | 1/2020 | Nasr et al. | |
| 2021/0014656 A1* | 1/2021 | Mueck | H04W 4/40 |

FOREIGN PATENT DOCUMENTS

| | | | | | |
|---|---|---|---|---|---|
| CN | 109783245 | A | | 5/2019 | |
| CN | 109823340 | A | * | 5/2019 | |
| CN | 109981434 | A | | 7/2019 | |
| CN | 110134491 | A | | 8/2019 | |
| CN | 110347517 | A | | 10/2019 | |
| CN | 110371108 | A | | 10/2019 | |
| CN | 110435880 | A | | 11/2019 | |
| DE | 102012017931 | A1 | | 3/2013 | |
| DE | 102020130668 | A1 | * | 5/2021 | ............ G06F 21/55 |
| EP | 3145793 | A1 | * | 3/2017 | ........... B62D 15/025 |
| JP | 2019-131177 | A | | 8/2019 | |
| JP | 2020-001679 | A | | 1/2020 | |
| JP | 2020-009412 | A | | 1/2020 | |
| KR | 20130128987 | A | | 11/2013 | |
| RU | 2670845 | C2 | * | 10/2018 | ............. G01S 13/86 |
| WO | WO-2014066429 | A1 | * | 5/2014 | ......... G06Q 30/0241 |
| WO | WO-2014172320 | A1 | * | 10/2014 | ............... B60Q 1/00 |
| WO | 2020158319 | A1 | | 8/2020 | |

* cited by examiner

METHOD, SYSTEM, AND APPARATUS FOR PROCESSING PARKING, AND VEHICLE CONTROLLER

CROSS-REFERENCE TO RELATED APPLICATIONS

This application claims priority to Chinese Patent Application No. 202010067384.4, filed on Jan. 20, 2020, titled "Method, system, and apparatus for processing parking, and vehicle controller," which is hereby incorporated by reference in its entirety.

TECHNICAL FIELD

Embodiments of the present disclosure relate to the field of intelligent transportation technology, specifically to the field of automated parking technology, and more specifically to a method, system, and apparatus for processing parking, and a vehicle controller.

BACKGROUND

With the development of communication technology, there are new possibilities for automatic parking and automated valet parking technologies.

At present, during the use of APA (Automatic Parking Assist) and AVP (Automated Valet Parking), the most common method is to connect a set of hardware to undertake the software system of APA and AVP. Using this method, although it can be decoupled from a vehicle's own system, the cost of newly added hardware accounts for more than 80% of the total selling price, therefore, the cost of the vehicle increases.

Therefore, there is a need for a method that can use the hardware carried by an in-vehicle system itself to use APA and AVP to reduce the use cost and maximize the use of existing vehicle resources.

SUMMARY

Embodiments of the present disclosure disclose a method, system, and apparatus for processing parking, and a vehicle controller, which may reduce the cost of a parking system and maximize the use of existing in-vehicle resources. Moreover, since no additional hardware is required, the installation cost caused by the additional hardware is also reduced, and the complexity of the system is reduced.

In a first aspect, an embodiment of the present disclosure provides a method for processing parking, executed by a parking system deployed on a vehicle controller, the parking system including a perception module and other modules except the perception module; the perception module being deployed on a first operating system in the vehicle controller; and the other modules being deployed on a second operating system in the vehicle controller; the method including: processing an image collected by an image collector through the perception module to obtain perception result data; and controlling a vehicle based on the perception result data obtained from the perception module by the other modules.

The embodiment in the above disclosure has the following advantages or beneficial effects: deploying the perception module on the first operating system, and deploying the other modules on the second operating system through the synergy of the first operating system and the second operating system, the parking system can use existing in-vehicle resources to realize automated parking without external hardware to reduce costs.

Alternatively, the first operating system and the second operating system have a shared memory area; and the perception module and the other modules perform data interaction through the shared memory area.

The embodiment in the above disclosure has the following advantages or beneficial effects: since the first operating system and the second operating system have a shared memory area, a data transmission speed is improved.

Alternatively, the shared memory area is used to acquire an image comprising ultrasound data from the second operating system, such that the first operating system acquires the image comprising ultrasound data from the shared memory area.

The embodiment in the above disclosure has the following advantages or beneficial effects: the ultrasound data enables the vehicle to acquire obstacle information around, and draw the ultrasound data in the image, so that the vehicle can control travelling based on surrounding environment after identifying the obstacles in the image.

Alternatively, the second operating system is further deployed with a surround view monitoring system; and the shared memory area is used to store the image collected by the image collector, such that the perception module and the surround view monitoring system acquire the image from the shared memory area.

The embodiment in the above disclosure has the following advantages or beneficial effects: the surround view monitoring system can acquire obstacles around the vehicle to control the vehicle to travel safely.

Alternatively, the first operating system is an Android operating system, and the second operating system is a QNX operating system.

The embodiment in the above disclosure has the following advantages or beneficial effects: the Android operating system supports deep learning of the perception module, and the QNX operating system runs steadily. The dual-system form can realize the purpose of using existing in-vehicle resources for automated parking.

In a second aspect, an embodiment of the present disclosure provides a method for processing parking, executed by a requester operating system in a vehicle controller, the method including: sending a clock synchronization request message to a receiver operating system at least two times; the clock synchronization request message comprising message sending time based on a time reference of the requester operating system; acquiring a clock synchronization feedback message of the receiver operating system; the clock synchronization feedback message comprising message receiving time based on a time reference of the receiver operating system; and determining a system time reference deviation between the requester operating system and the receiver operating system, based on the message receiving time and the message sending time of the clock synchronization at least two times.

The embodiment in the above disclosure has the following advantages or beneficial effects: by determining the system time reference deviation, it is possible to make a parking control command issued by the vehicle more accurate.

Alternatively, the determining the system time reference deviation between the requester operating system and the receiver operating system, based on the message receiving time and the message sending time of the clock synchronization at least two times, includes: determining separately time differences between the message receiving time and the message sending time during the clock synchronization at least two times; and using a minimum time difference in the time differences of the clock synchronization at least two times as the system time reference deviation between the requester operating system and the receiver operating system.

The embodiment in the above disclosure has the following advantages or beneficial effects: using the minimum time difference in the time differences as the system time reference deviation may effectively avoid the case of using the time of a message delay during the clock synchronization as the system time reference deviation.

Alternatively, after determining the system time reference deviation between the requester operating system and the receiver operating system, the method further includes: acquiring a target data message sent by the receiver operating system, wherein the target data message comprises target data sending time based on the time reference of the receiver operating system; and determining target data sending time based on the time reference of the requester operating system, based on the system time reference deviation and the target data sending time.

The embodiment in the above disclosure has the following advantages or beneficial effects: by determining the accurate time of target data sending based on the system time reference of the requester operating system, the accuracy of control command sending in automated parking can be improved.

Alternatively, the requester operating system is a QNX operating system, and the receiver operating system is an Android operating system.

The embodiment in the above disclosure has the following advantages or beneficial effects: the target data sending time sent by the QNX operating system can be determined to improve the accuracy of the dual-system controlled vehicle.

In a third aspect, an embodiment of the present disclosure provides a parking system, including a perception module and other modules except the perception module; the perception module being deployed on a first operating system in a vehicle controller; the other modules being deployed on a second operating system in the vehicle controller; where the perception module is configured to process an image collected by an image collector to obtain perception result data; and the other modules are configured to control a vehicle based on the perception result data obtained from the perception module.

In a fourth aspect, an embodiment of the present disclosure provides an apparatus for processing parking, configured in a requester operating system in a vehicle controller, the apparatus including: a message sending module, configured to send a clock synchronization request message to a receiver operating system at least two times; the clock synchronization request message comprising message sending time based on a time reference of the requester operating system; a message acquisition module, configured to acquire a clock synchronization feedback message of the receiver operating system; the clock synchronization feedback message comprising message receiving time based on a time reference of the receiver operating system; and a reference deviation determining module, configured to determine a system time reference deviation between the requester operating system and the receiver operating system, based on the message sending time and the message receiving time of the clock synchronization at least two times.

In a fifth aspect, an embodiment of the present disclosure provides a vehicle controller, deployed with a parking system, the parking system comprising a perception module, and other modules except the perception module; where: the perception module is deployed on a first operating system in the vehicle controller; the other modules are deployed on a second operating system in the vehicle controller; the perception module is configured to process an image collected by an image collector to obtain perception result data; and the other modules are configured to control a vehicle based on the perception result data obtained from the perception module.

The embodiment in the above disclosure has the following advantages or beneficial effects: deploying the perception module on the first operating system, and deploying the other modules on the second operating system, through the synergy of the first operating system and the second operating system, the parking system can use existing in-vehicle resources to realize automated parking without external hardware to reduce costs.

Other effects possessed by the foregoing alternative implementations will be described below in conjunction with specific embodiments.

BRIEF DESCRIPTION OF THE DRAWINGS

The accompanying drawings are used to better understand the present solution and do not constitute a limitation of the present disclosure.

DETAILED DESCRIPTION OF EMBODIMENTS

The following describes exemplary embodiments of the present disclosure in conjunction with the accompanying drawings, which includes various details of the embodiments of the present disclosure to facilitate understanding, and they should be considered as merely exemplary. Therefore, those of ordinary skill in the art should recognize that various changes and modifications can be made to the embodiments described herein without departing from the scope and spirit of the present disclosure. Also, for clarity and conciseness, descriptions of well-known functions and structures are omitted in the following description.

First Embodiment

Figure 1A:
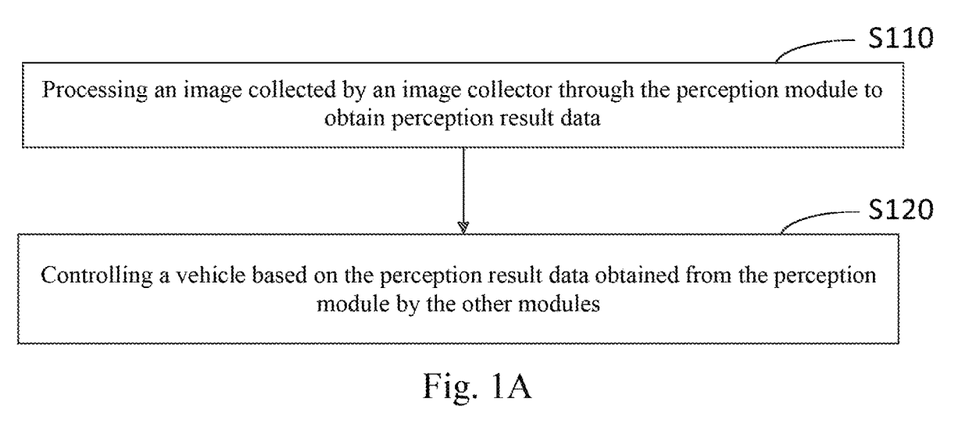
FIG. 1a is a schematic flowchart of a method for processing parking according to a first embodiment of the present disclosure.

FIG. 1a is a schematic flowchart of a method for processing parking according to the first embodiment of the present disclosure. The present embodiment is used in the case where a parking system parks automatedly. The embodiments of the present disclosure are executed by a parking system deployed on a vehicle controller. The parking system includes a perception module and other modules except the perception module; the perception module is deployed on a first operating system in the vehicle controller; and the other modules are deployed on a second operating system in the vehicle controller. As shown in FIG. 1a, the method for processing parking provided in the present embodiment may include the following steps.

S110, processing an image collected by an image collector through the perception module to obtain perception result data.

In the present embodiment, the perception module is a module that supports deep learning algorithms. This module requires the use of GPU (Graphics Processing Unit) and DSP (Digital Signal Processing) computing power in the vehicle controller. Here, GPU, also known as display core, visual processor, and display chip, is a kind of microprocessor specialized in image and graphics related computing work on personal computers, workstations, game consoles and mobile devices. DSP is to use a computer or dedicated processing equipment to process such as collect, transform, filter, estimate, enhance, compress, or identify a signal in digital form to obtain a signal form that meets the needs. In the present embodiment, the image collector may be a camera mounted on the vehicle. The perception result data is data obtained by the perception module after processing the image. Exemplarily, the perception result data may be profile data information of obstacles in the surrounding environment, or may be data information of vacant parking spaces.

Alternatively, the first operating system is an Android operating system, and the second operating system is a QNX operating system.

In the present embodiment, vehicles, especially autonomous driving vehicles, typically have QNX+Android dual operating systems having built-in vehicle control chips. The Android operating system is an operating system based on Linux open source code. The Android operating system can use the computing power of GPU and DSP in the vehicle controller, so that after deploying the perception module on the Android operating system, it can support the perception module to process the image. The QNX operating system is a distributed real-time operating system. The QNX operating system may be implemented using the CPU in the vehicle controller, and the QNX operating system cannot use the computing power of GPU and DSP in the vehicle controller.

S120, controlling a vehicle based on the perception result data obtained from the perception module by the other modules.

In the present embodiment, other modules may include a control module, a planning module, an environment modeling module, and a time synchronization module, etc., where the control module issues a control command to the vehicle based on the perception result data. The planning module is configured to plan a vehicle path and control a vehicle chassis. The environment modeling module is configured to perform multi-channel and multi-frame fusion based on the perception result data and construct obstacle information. The time synchronization module is configured to synchronize time of the first operating system and the second operating system.

Alternatively, the first operating system and the second operating system have a shared memory area; and the perception module and the other modules perform data interaction through the shared memory area.

In the present embodiment, the shared memory area is an area for interaction between the first operating system and the second operating system. The shared memory area can store the image collected from the image collector and interaction data between the perception module and other modules.

Figure 1B:
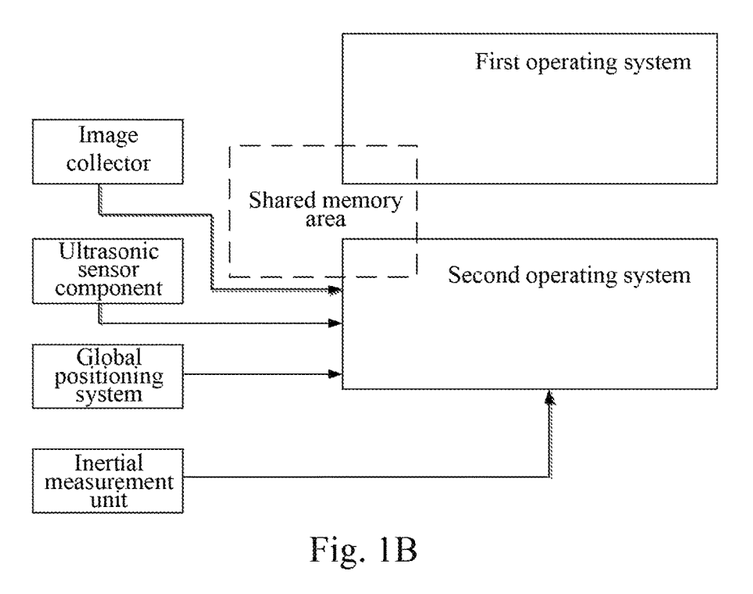
FIG. 1b is an architecture diagram of a vehicle controller according to the first embodiment of the present disclosure.

Specifically, reference may be made to an architecture diagram of a vehicle controller shown in FIG. 1b. Referring to FIG. 1b, both the first operating system and the second operating system can acquire data from the shared memory area, which may improve a data transmission efficiency between the dual operating systems.

Specifically, the second operating system acquires sensing data detected by a vehicle sensor and image data collected by the image collector. The second operating system processes the sensing data, for example, performs obstacle recognition on ultrasonic sensing data to obtain ultrasound obstacle information, and draw an image including ultrasound based on the ultrasound obstacle information and the image data. The second operating system stores the image including ultrasound in the shared memory area, and the first operating system may acquire the image including ultrasound from the shared memory area. The vehicle sensor may include: an ultrasonic sensor component, a global positioning system, or an inertial measurement unit.

Specifically, the perception module writes the perception result data into the shared memory area, and other modules acquire the perception result data from the shared memory area.

Further, the first operating system and the second operating system may also perform data interaction through virtual network communication. A virtual network link does not contain a physical connection between two computing devices, but is implemented through network virtualization. The two most common forms of virtual networks are protocol-based virtual networks (such as VLAN, VPN, and VPLS) and virtual device based (such as a network connection virtual machine inside hypervisor) virtual networks.

Alternatively, the second operating system is also deployed with a surround view monitoring system; and the shared memory area is used to store the image collected by the image collector, such that the perception module and the surround view monitoring system acquire the image from the shared memory area.

In the present embodiment, the surround view monitoring system is to set up 4 to 8 wide-angle image collectors around the vehicle that can cover all the field of view around the vehicle, process multi-channel video images collected synchronously into a 360-degree top view of the vehicle body around the vehicle, and finally display it on the screen of the center console to facilitate vehicle control. Specifically, after the image collector collects the multi-channel video images synchronously, these images are stored in the shared memory area, and the surround view monitoring system can acquire the images from the shared memory area.

Alternatively, the shared memory area is used to acquire an image including ultrasound data from the second operating system, such that the first operating system acquires the image including ultrasound data from the shared memory area.

In the present embodiment, the ultrasonic sensor component is installed around the vehicle to detect the situation around the vehicle, and the ultrasound data is drawn in the image collected by the image collector, and the image carrying the ultrasound data is stored in the shared memory area.

The embodiment in the above disclosure has the following advantages or beneficial effects: deploying the perception module on the first operating system, and deploying the other modules on the second operating system, through the synergy of the first operating system and the second operating system, the parking system can use existing in-vehicle resources to realize automated parking without hardware to reduce costs.

Second Embodiment

Figure 2:
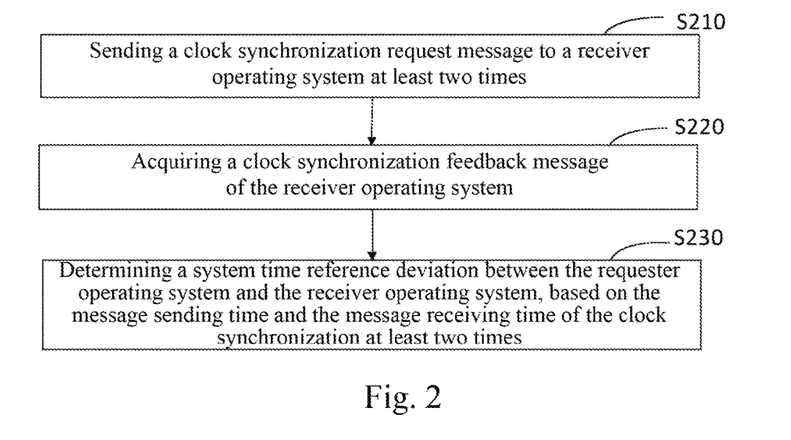
FIG. 2 is a schematic flowchart of a method for processing parking according to a second embodiment of the present disclosure.

FIG. 2 is a schematic flowchart of a method for processing parking according to the second embodiment of the present disclosure. The present embodiment is used in the case where a parking system parks automatedly, and is specifically used for time synchronization between a receiver operating system and a requester operating system. The embodiment of the present disclosure is executed by the requester operating system in a vehicle controller. As shown in FIG. 2, the method for processing parking provided in the present embodiment may include the following steps.

S210, sending a clock synchronization request message to a receiver operating system at least two times.

In the present embodiment, the clock synchronization request message includes a message sending time based on a time reference of a requester operating system. The clock synchronization request message is sent by the requester operating system to the receiver operating system to synchronize the clocks of the requester operating system and the receiver operating system. Because a system time reference between the requester operating system and the receiver operating system is different, the message sending time in the clock synchronization request message is counted based on the time reference of the requester operating system. Further, the clock synchronization request message may also carry the message ID.

In order to facilitate the perception module in the parking system to send the perception result data to the other modules, alternatively, the requester operating system is a QNX operating system, and the receiver operating system is an Android operating system.

S220, acquiring a clock synchronization feedback message of the receiver operating system.

In the present embodiment, the clock synchronization feedback message includes message receiving time based on a time reference of the receiver operating system.

Figure 3:
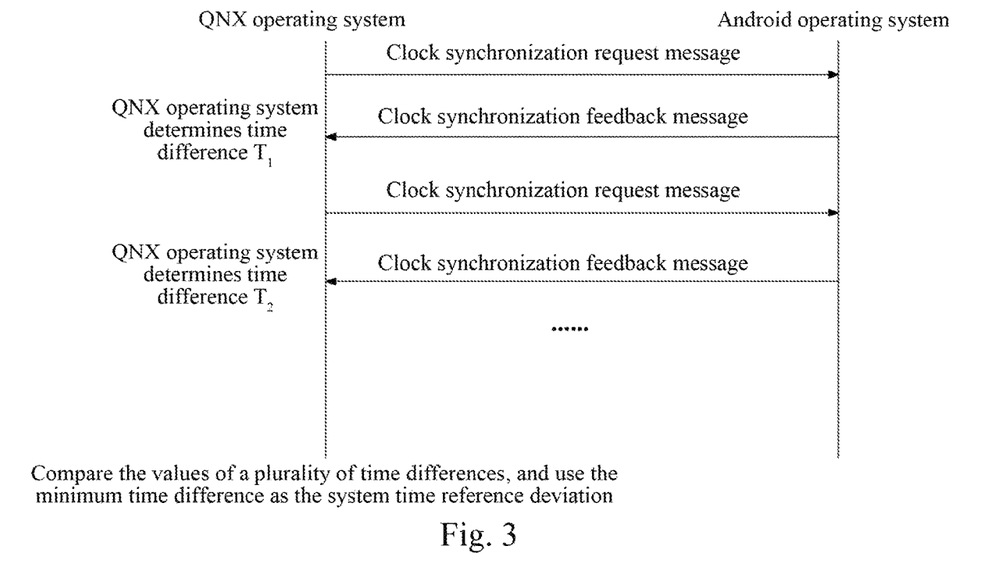
FIG. 3 is a schematic diagram of a process of clock synchronization message interaction according to the second embodiment of the present disclosure.

The clock synchronization feedback message is sent by the receiver operating system to the requester operating system after receiving the clock synchronization request message. The clock synchronization feedback message includes the ID of the feedback message. For a specific interaction process, reference may be made to a schematic diagram of a process of clock synchronization message interaction shown in FIG. 3.

S230, determining a system time reference deviation between the requester operating system and the receiver operating system, based on the message receiving time and the message sending time of the clock synchronization at least two times.

In the present embodiment, based on a difference between the message receiving time and the message sending time, the system time reference deviation between the requester operating system and the receiver operating system may be determined. Because network delay is unstable, the clock synchronization message should be sent a plurality of times (for example, 50 times) to minimize an error caused by message delay as much as possible.

Alternatively, determining a system time reference deviation between the requester operating system and the receiver operating system, based on the message receiving time and the message sending time of the clock synchronization at least two times, includes: determining separately time differences between the message receiving time and the message sending time during the clock synchronization at least two times; and using a minimum time difference in the time differences of the clock synchronization at least two times as the system time reference deviation between the requester operating system and the receiver operating system.

Specifically, the difference between the message receiving time and the message sending time in each clock synchronization process is obtained to obtain a plurality of time differences. The minimum time difference is used as the system time reference deviation between the requester operating system and the receiver operating system. The advantage of this setting is that the message delay of the minimum time difference has the smallest effect, such that the system time reference deviation between the requester operating system and the receiver operating system is more accurate.

Alternatively, after determining the system time reference deviation between the requester operating system and the receiver operating system, the method further includes: acquiring a target data message sent by the receiver operating system, where the target data message includes target data sending time based on the time reference of the receiver operating system; and determining target data sending time based on the time reference of the requester operating system, based on the system time reference deviation and the target data sending time.

In the present embodiment, the target data message may be the perception result data sent by the receiver operating system. In the present embodiment, the receiver operating system may be an Android operating system, and the requester operating system may be a QNX operating system. Based on the sending time of the Android operating system and the system time reference deviation, the sending time of the perception result data in the QNX operating system can be determined. The advantage of this setting is that it can make a parking control command issued by the QNX operating system more accurate.

The embodiment in the above disclosure has the following advantages or beneficial effects: the target data sending time sent by the QNX operating system can be determined to improve the accuracy of the dual-system controlled vehicle.

Third Embodiment

Figure 4:
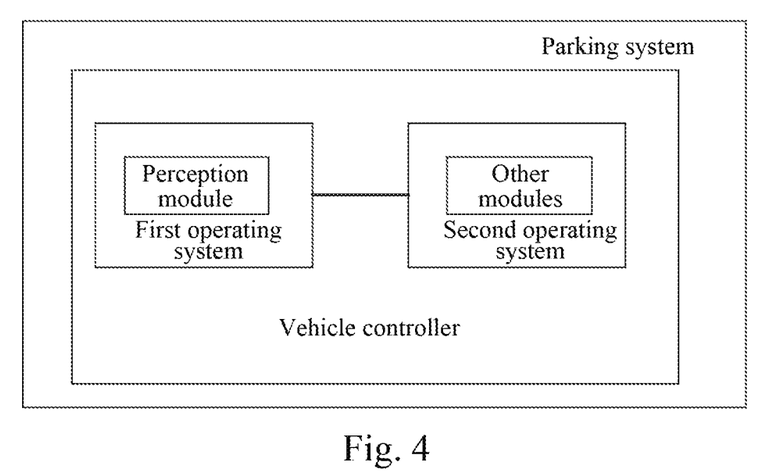
FIG. 4 is a schematic structural diagram of a parking system according to a third embodiment of the present disclosure.

FIG. 4 is a schematic structural diagram of a parking system according to the third embodiment of the present disclosure, the parking system is capable of performing the foregoing method for processing parking, and the system includes: a perception module, and other modules except the perception module; where the perception module is deployed on a first operating system in a vehicle controller; the other modules are deployed on a second operating system in the vehicle controller; the perception module, is configured to process an image collected by an image collector to obtain perception result data; and the other modules, are configured to control a vehicle based on the perception result data obtained from the perception module.

The first operating system and the second operating system have a shared memory area; and the perception module and the other modules perform data interaction through the shared memory area.

The shared memory area is used to acquire an image including ultrasound data from the second operating system, such that the first operating system acquires the image including ultrasound data from the shared memory area.

The second operating system is also deployed with a surround view monitoring system; and the shared memory area is used to store the image collected by the image collector, such that the perception module and the surround view monitoring system acquire the image from the shared memory area.

The first operating system is an Android operating system, and the second operating system is a QNX operating system.

The system in the present implementation may perform the method for processing parking provided by the embodiments of the present disclosure, and has the corresponding function modules and beneficial effects for performing the method.

Fourth Embodiment

Figure 5:
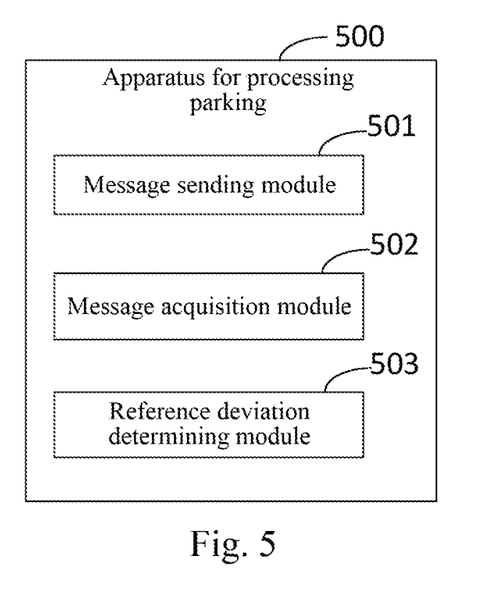
FIG. 5 is a schematic structural diagram of an apparatus for processing parking according to a fourth embodiment of the present disclosure.

FIG. 5 is a schematic structural diagram of an apparatus for processing parking according to the fourth embodiment of the present disclosure. The apparatus is configured in a requester operating system in a vehicle controller, and may perform a method for processing parking provided by the embodiments of the present disclosure, and has the corresponding function modules and beneficial effects for performing the method. As shown in FIG. 5, the apparatus 500 may include: a message sending module 501, configured to send a clock synchronization request message to a receiver operating system at least two times; the clock synchronization request message including message sending time based on a time reference of the requester operating system; a message acquisition module 502, configured to acquire a clock synchronization feedback message of the receiver operating system; the clock synchronization feedback message including message receiving time based on a time reference of the receiver operating system; and a reference deviation determining module 503, configured to determine a system time reference deviation between the requester operating system and the receiver operating system, based on the message sending time and the message receiving time of the clock synchronization at least two times.

The reference deviation determining module 503 is specifically configured to: determine separately time differences between the message receiving time and the message sending time during the clock synchronization at least two times; and use a minimum time difference in the time differences of the clock synchronization at least two times as the system time reference deviation between the requester operating system and the receiver operating system.

The apparatus is further configured to: acquire a target data message sent by the receiver operating system, where the target data message includes target data sending time based on the time reference of the receiver operating system; and determine target data sending time based on the time reference of the requester operating system, based on the system time reference deviation and the target data sending time.

The requester operating system is a QNX operating system, and the receiver operating system is an Android operating system.

Fifth Embodiment

According to a fifth embodiment of the present disclosure, a vehicle controller is provided, which may perform a method for processing parking provided by the embodiments of the present disclosure. The vehicle controller is deployed with a parking system, the parking system including a perception module, and other modules except the perception module; the perception module is deployed on a first operating system in the vehicle controller; the other modules are deployed on a second operating system in the vehicle controller; the perception module is configured to process an image collected by an image collector to obtain perception result data; and the other modules are configured to control a vehicle based on the perception result data obtained from the perception module.

According to an embodiment of the present disclosure, the present disclosure further provides an electronic device and a readable storage medium.

Figure 6:
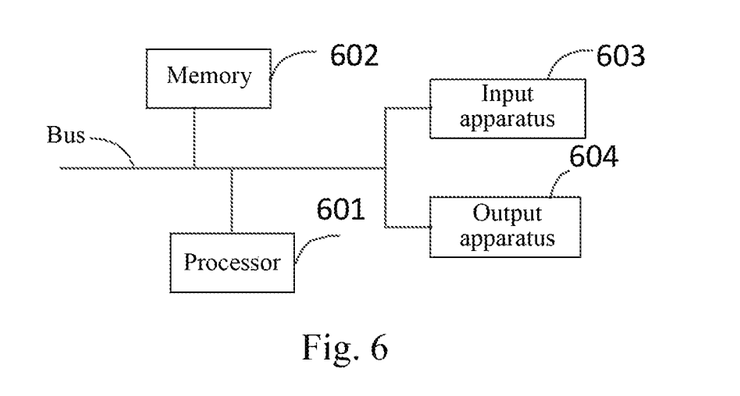
FIG. 6 is a block diagram of an electronic device for implementing a method for processing parking according to embodiments of the present disclosure.

As shown in FIG. 6, which is a block diagram of an electronic device of a method for processing parking according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by the present disclosure. The memory stores instructions executable by at least one processor, so that the at least one processor performs the method for processing parking provided by the present disclosure. The non-transitory computer readable storage medium of the present disclosure stores computer instructions for causing a computer to perform the method for processing parking provided by the present disclosure.

The memory 602, as a non-transitory computer readable storage medium, may be used to store non-transitory software programs, non-transitory computer executable programs and modules, such as program instructions/modules corresponding to the method for processing parking in the embodiments of the present disclosure (for example, the message sending module 501, the message acquisition module 502, and the reference deviation determining module 503 shown in FIG. 5). The processor 601 executes the non-transitory software programs, instructions, and modules stored in the memory 602 to execute various functional applications and data processing of the server, that is, to implement the method for processing parking in the foregoing method embodiment.

The memory 602 may include a storage program area and a storage data area, where the storage program area may store an operating system and at least one function required application program; and the storage data area may store data created by the use of the electronic device according to the method for processing parking, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for processing parking through a network. Examples of the above network include but are not limited to the Internet, intranet, local area network, mobile communication network, and combinations thereof.

The electronic device of the method for processing parking may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, deploying the perception module on the first operating system, and deploying the other modules on the second operating system, through the synergy of the first operating system and the second operating system, the parking system can use existing in-vehicle resources to realize automated parking without connecting hardware to reduce costs.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing parking, executed by a parking system deployed on a vehicle controller, the parking system comprising a perception module and other modules except the perception module; the perception module being deployed on a first operating system, using computing power of a GPU and a DSP of the vehicle controller, in the vehicle controller; and the other modules being deployed on a second operating system, different from the first operating system and being implemented by a CPU of the vehicle controller, in the vehicle controller;

the method comprising:
processing an image collected by an image collector through the perception module to obtain perception result data; and
controlling a vehicle based on the perception result data obtained from the perception module by the other modules.

2. The method according to claim 1, wherein the first operating system and the second operating system have a shared memory area; and
the perception module and the other modules perform data interaction through the shared memory area.

3. The method according to claim 2, wherein the shared memory area is used to acquire an image comprising ultrasound data from the second operating system, such that the first operating system acquires the image comprising ultrasound data from the shared memory area.

4. The method according to claim 2, wherein the second operating system is further deployed with a surround view monitoring system; and
the shared memory area is used to store the image collected by the image collector, such that the perception module and the surround view monitoring system acquire the image from the shared memory area.

5. The method according to claim 1, wherein the first operating system is an Android operating system, and the second operating system is a QNX operating system.

6. The method according to claim 1, further comprising:
sending, by the second operating system in the vehicle controller, a clock synchronization request message to a receiver operating system at least two times; the clock synchronization request message comprising message sending time based on a time reference of the requester operating system, the receiver operating system being the first operation system;
acquiring, by the second operating system in the vehicle controller, a clock synchronization feedback message of the receiver operating system; the clock synchronization feedback message comprising message receiving time based on a time reference of the receiver operating system; and
determining, by the second operating system in the vehicle controller, a system time reference deviation between the requester operating system and the receiver operating system, based on the message receiving time and the message sending time of the clock synchronization at least two times.

7. The method according to claim 6, wherein the determining, by the second operating system in the vehicle controller, the system time reference deviation between the requester operating system and the receiver operating system, based on the message receiving time and the message sending time of the clock synchronization at least two times, comprises:
determining, by the second operating system in the vehicle controller, separately time differences between the message receiving time and the message sending time during the clock synchronization at least two times; and
using, by the second operating system in the vehicle controller, a minimum time difference in the time differences of the clock synchronization at least two times as the system time reference deviation between the requester operating system and the receiver operating system.

8. The method according to claim 7, wherein, after determining, by the second operating system in the vehicle controller, the system time reference deviation between the requester operating system and the receiver operating system, the method further comprises:
acquiring, by the second operating system in the vehicle controller, a target data message sent by the receiver operating system, wherein the target data message comprises target data sending time based on the time reference of the receiver operating system; and
determining, by the second operating system in the vehicle controller, target data sending time based on the time reference of the requester operating system, based on the system time reference deviation and the target data sending time.

9. A parking system, comprising a perception module and other modules except the perception module; the perception module being deployed on a first operating system, using computing power of a GPU and a DSP of the vehicle controller, in a vehicle controller; the other modules being deployed on a second operating system, different from the first operating system and being implemented by a CPU of the vehicle controller, in the vehicle controller;
wherein the perception module is configured to process an image collected by an image collector to obtain perception result data; and
the other modules are configured to control a vehicle based on the perception result data obtained from the perception module.

10. The parking system according to claim 9, wherein the first operating system and the second operating system have a shared memory area; and
the perception module and the other modules perform data interaction through the shared memory area.

11. The parking system according to claim 10, wherein the shared memory area is used to acquire an image comprising ultrasound data from the second operating system, such that the first operating system acquires the image comprising ultrasound data from the shared memory area.

12. The parking system according to claim 10, wherein the second operating system is further deployed with a surround view monitoring system; and
the shared memory area is used to store the image collected by the image collector, such that the perception module and the surround view monitoring system acquire the image from the shared memory area.

13. The parking system according to claim 9, wherein the first operating system is an Android operating system, and the second operating system is a QNX operating system.

* * * * *